United States Patent [19]

Ueno et al.

[11] Patent Number: 4,722,816

[45] Date of Patent: Feb. 2, 1988

[54] METHOD FOR THE PREPARATION OF SHAPED ARTICLES OF A VINYL CHLORIDE-BASED RESIN HAVING IMPROVED SURFACE PROPERTIES

[75] Inventors: Susumu Ueno; Shigehiro Hoshida; Kouiti Kuroda, all of Ibaraki; Kenji Fushimi, Chiba, all of Japan

[73] Assignee: Shin-Etsu Chemical Co., Ltd., Tokyo, Japan

[21] Appl. No.: 865,474

[22] Filed: May 21, 1986

[30] Foreign Application Priority Data

May 21, 1985 [JP] Japan .................................. 60-109003

[51] Int. Cl.$^4$ ............................................. B29C 71/04
[52] U.S. Cl. ...................................... 264/22; 204/169; 264/25; 264/83; 264/101; 264/211; 264/211.12; 264/340
[58] Field of Search ...................... 264/22, 25, 83, 135, 264/340, 211.12, 101, 211; 204/164, 169

[56] References Cited

U.S. PATENT DOCUMENTS

| | | | |
|---|---|---|---|
| 3,623,940 | 11/1971 | Gladstone et al. | 264/22 |
| 4,307,045 | 12/1981 | Imada et al. | 264/22 |
| 4,315,808 | 2/1982 | Imada et al. | 264/22 |
| 4,317,788 | 3/1982 | Imada et al. | 264/22 |
| 4,370,212 | 1/1983 | Mahr et al. | 264/22 |
| 4,434,251 | 2/1984 | Sasajima et al. | 264/25 |
| 4,507,539 | 3/1985 | Sando et al. | 264/22 |
| 4,517,142 | 5/1985 | Baniel | 264/22 |

FOREIGN PATENT DOCUMENTS 59-98140  6/1984  Japan .................................. 264/22

*Primary Examiner*—Jeffery Thurlow
*Attorney, Agent, or Firm*—Wenderoth, Lind & Ponack

[57] ABSTRACT

A vinyl chloride-based resin is compounded with a filler, e.g. calcium carbonate, having been treated on the surface with an epoxy compound such as 3-glycidyloxypropyl trimethoxy silane in advance and the resin composition is shaped into an article which is then subjected to a low temperature plasma treatment. The thus obtained shaped article is imparted with remarkably improved surface properties such as decrease in the phenomenon of plasticizer bleeding and the effect is very durable even after prolonged outdoor exposure of the article.

4 Claims, No Drawings

METHOD FOR THE PREPARATION OF SHAPED ARTICLES OF A VINYL CHLORIDE-BASED RESIN HAVING IMPROVED SURFACE PROPERTIES

BACKGROUND OF THE INVENTION

The present invention relates to a method for the preparation of a shaped article of a vinyl chloride-based resin composition having improved surface properties. More particularly, the invention relates to a method for the preparation of a shaped article of a vinyl chloride-based resin composition having improved surface properties in respect of the insusceptibility to surface stain, weatherability, heat resistance, resistance against chemicals and oils, insusceptibility to blocking, decreased bleeding of plasticizers and others.

As is well known, vinyl chloride-based resins belong to one of the most important classes of general-purpose synthetic plastics by virtue of the versatility in respect of the rigidity of the shaped articles thereof ranging from rigid articles without formulation of a plasticizer to flexible articles prepared by compounding the resin with a substantial amount of a plasticizer. Besides the plasticizers used for controlling the flexibility or rigidity of the shaped articles, vinyl chloride-based resins are compounded with various kinds of other additives or compounding agents such as stabilizers, lubricants, antioxidants, chelating agents, anti-fogging agents, ultraviolet absorbers, fillers and so on depending on the intended application of the resin composition including films, sheets, artificial leathers, tubes, hoses, packings, covering materials and the like used in medical implements, wrapping materials of foods, insulation of electric wires, building materials and the like.

One of the serious problems almost always encountered in these shaped articles of a vinyl chloride-based resin compounded with the above mentioned additives is that the plasticizer and other additive ingredients contained therein migrate toward the surface of the article eventually to cause an undesirable phenomenon of bleeding or blooming in the lapse of time so that the shaped articles suffer decreased, beauty of the appearance, adverse influences on the chemical and physical properties of the shaped articles, durability and other disadvantages. In particular, such a phenomenon of bleeding or blooming of the additive ingredients on the surface is quite undesirable in the applications in the fields of medicine or foodstuff when the additive ingredient is toxic or physiologically unacceptable.

Various proposals and attempts of course have been made in the prior art in order to overcome the above mentioned problems including irradiation of the surface of the article with ionizing radiations or ultraviolet light and treatment of the surface wih a chemical agent. These prior art methods are of course effective to increase the heat resistance and solvent resistance and to impart hydrophilicity, insusceptibility to accumulation static electric charge and printability to the surface. These prior art methods, however, are rather ineffective when bleeding of the plasticizer and the like on the surface should be prevented or reduced with, on the other hand, some adverse effects on the advantageous properties inherent in the vinyl chloride-based resin.

Namely, the ionizing radiations usually have high energy so that the effect thereof is sometimes not limited to the very surface of the articles but the radiation penetrates more or less to the depth of the article to cause undesired alterations in the properties of the article due to, for example, formation of intermolecular crosslinks. When a shaped article of a vinyl chloride-based resin composition is irradiated with ultraviolet light, the surface of the article is sometimes not free from the problem of disadvantageous coloration. The chemical means in the prior art are also not free from the problems in respect of the corrosiveness of the treatment agent, poor adhesion of the agent to affect the durability of the effect by the treatment and so on.

A considerably effective method has recently been reported to improve the surface properties of a shaped article of a vinyl chloride-based resin composition that the surface of the shaped article is subjected to a treatment of exposure to an atmosphere of low temperature plasma so as to prevent bleeding of the plasticizer contained therein on the surface. The method of low temperature plasma treatment is indeed effective at least for a length of time immediately following the plasma treatment but the durability of the effect is far from satisfactory since the effect gradually disappears in the lapse of time when the treated article is used prolongedly, especially, in an outdoor condition so that it has been eagerly desired to develop a novel and effective method in the above mentioned object without the problems and disadvantages in the prior art methods.

SUMMARY OF THE INVENTION

Thus, the method of the present invention established as a result of the extensive investigations undertaken in the above mentioned object comprises:

(a) compounding (A) a vinyl chloride-based resin with (B) a filler having been treated on the surface with an epoxy compound, the amount of the epoxy compound being in the range from 0.05 to 30 parts by weight per 100 parts by weight of the vinyl chloride-based resin, to give a vinyl chloride-based resin composition;

(b) shaping the vinyl chloride-based resin composition into an article; and (c) subjecting the shaped article to a treatment of exposure to an atmosphere of low temperature plasma of an inorganic gas under a pressure in the range from 0.001 to 10 Torr.

DETAILED DESCRIPTION OF THE PREFERRED EMBODIMENTS

As is understood from the above given summarizing description, the most unique feature of the inventive method is in the compounding of the vinyl chloride-based resin composition before shaping with a specific additive which is a filler having been surface-treated with an epoxy compound followed by shaping an article which is then subjected to a low temperature plasma treatment. The shaped article prepared in accordance with the above described method is imparted with markedly improved surface properties including the greatly decreased bleeding of the plasticizer and insusceptibility of the surface to contamination or stain. Moreover, the advantageous effect obtained in the above described inventive method is quite durable so that the shaped article prepared according to the inventive method can be used prolongedly even under an adverse condition of outdoor exposure without losing the effect obtained by the low temperature plasma treatment.

The principal component in the resin composition of which the shaped article is prepared according to the inventive method is of course a vinyl chloride-based resin which is not particularly limited to homopolymeric polyvinyl chloride resins but can be a copolymeric resin obtained by the copolymerization of a monomer mixture composed of vinyl chloride in an amount of, for example, 50 % by weight or more combined with one or more of comonomers copolymerizable with vinyl chloride. The comonomers to be copolymerized with vinyl chloride include vinyl esters, e.g. vinyl acetate, vinyl ethers, acrylic and methacrylic acids and esters thereof, maleic and fumaric acids and esters thereof, maleic anhydride, aromatic vinyl compound, e.g. styrene, vinylidene halides, e.g. vinylidene chloride, unsaturated nitriles, e.g. acrylonitrile and methacrylonitrile, olefins, e.g. ethylene and propylene, and the like.

The specific additive as the component (B) essentially compounded with the above mentioned vinyl chloride-based resin is a filler surface-treated with an epoxy compound. The filler is not particularly limited to a particular kind but may be any of particulate or fibrous materials used conventionally in vinyl chloride-based resin compositions although calcium carbonate and titanium dioxide are preferable. The epoxy compound for the surface treatment of the filler is also not particularly limitative provided that the compound has at least one epoxy group in a molecule. Particularly suitable ones are exemplified by 3-glycidyloxypropyl trimethoxy silane and a hydrolysis-condensation product thereof, 3-glycidyloxypropyl triethoxy silane and a hydrolysis-condensation product thereof, phenyl glycidyl ether, ethyleneglycol diglycidyl ether, vinyl cyclohexene diepoxide, N,N-diglycidylamine, divinylbenzene diepoxide, resorcinol diglycidyl ether, polyepichlorohydrin, triglycidyl cyanurate, 1,3-bis(N,N-diglycidylaminomethyl) cyclohexane, N,N,N'N'-tetraglycidyl 1,3-xylenediamine and the like, of which the first mentioned epoxy-containing organosilicon compounds or hydrolysis-condensation products thereof give quite satisfactory results.

The surface treatment of the filler with the epoxy compound can be carried out in any convenient procedure including wet blending and dry blending. For example, a filler surface-treated with the epoxy compound can be prepared by a simple procedure of merely blending the filler and the epoxy compound in a suitable mixing machine such as a Henschel mixer and the like. The overall amount of the filler incorporated into the resin composition should not exceed 100 parts by weight or, preferably, 50 parts by weight per 100 parts by weight of the vinyl chloride-based resin as the component (A). An excessively large amount of a filler is undesirable due to the possible adverse influences on the mechanical and other properties of the shaped articles of the resin composition.

The amount of the epoxy compound incorporated into the resin composition as carried by the filler should be in the range from 0.05 to 30 parts by weight or, preferably, from 0.5 to 10 parts by weight per 100 parts by weight of the vinyl chloride-based resin. When the amount thereof is too small, the desired advantageous effect of the inventive method cannot be obtained as a matter of course. An amount of the epoxy compound in excess of the above mentioned upper limit is not detrimental in respect of the properties of the resin composition or the shaped articles thereof though with economical disadvantages. It is not essential that the surface treatment of the filler with the epoxy compound is uniform over the whole amount of the filler but a portion of the filler is surface-treated with the epoxy compound and the thus surface-treated filler is combined with a supplementary portion of the untreated filler.

The vinyl chloride-based resin composition composed of a vinyl chloride-based resin and the surface-treated filler in the above mentioned specific proportion can of course be further admixed according to need with various kinds of known additives and compounding agents conventionally used in vinyl chloride-based resin compositions for shaping articles. Firstly, the plasticizers to impart flexibility to the shaped articles are exemplified by phthalate esters, e.g. dioctyl phthalate, dibutyl phthalate and butyl benzyl phthalate, esters of aliphatic dibasic acids, e.g. dioctyl adipate and dibutyl sebacate, esters of pentaerithritol, esters of glycols, e.g. diethyleneglycol dibenzoate, esters of monobasic carboxylic acids, e.g. methyl acetylricinolate, phosphate esters, e.g. tricresyl phosphate and triphenyl phosphate, epoxidized oils, e.g. epoxidized soybean oil and epoxidized linseed oil, citric acid esters, e.g. acetyl tributyl citrate and acetyl trioctyl citrate, polyester-type compounds, e.g. trialkyl trimellitates, tetra-n-octyl pyromellitate and polypropylene adipate, and so on.

Furthermore, the optional additives include stabilizers used to impart heat resistance and stability to the shaped articles exemplified by metal salts of carboxylic acids, e.g. calcium stearate, zinc stearate, lead stearate, barium stearate and cadmium stearate, lead compounds, e.g. tribasic lead sulfate and dibasic lead phosphite, organic tin compounds, e.g. dibutyltin dilaurate, di-n-octyltin maleate and di-n-octyltin mercaptide, and the like, lubricants to facilitate the shaping works of the resin composition into articles exemplified by fatty acid amides, e.g. ethylene bisstearoamide, higher fatty acids and esters thereof, polyethylene waxes and the like, fillers, antioxidants, ultraviolet absorbers, antistatic agents, anti-fogging agents, pigments, crosslinking aids and so on.

It is further optional that the resin composition is admixed with a rubbery polymer to improve the physical properties of the shaped articles. Suitable rubbery polymers having compatibility with the vinyl chloride-based resin include copolymers of ethylene and vinyl acetate, copolymers of acrylonitrile and butadiene, copolymers of styrene and acrylonitrile, copolymers of methyl methacrylate, styrene and butadiene, urethane elastomers, copolymers of acrylonitrile, styrene and butadiene, polyamide resins, polymers of caprolactam, epoxy-modified polybutadiene resins and the like. The amount of these rubbery polymers in the resin composition should not be excessively large or should not exceed 50 parts by weight per 100 parts by weight of the vinyl chloride-based resin in order to retain the excellent properties inherent in the vinyl chloride-based resins.

The step (a) of the inventive method in which the vinyl chloride-based resin composition is prepared according to the above described manner is followed by the step (b) for shaping the resin composition into a shaped article. The method for shaping the resin composition is not particularly limitative and any of the conventional methods known in the art is applicable depending on the nature of the resin composition and the type of the desired shaped articles including extrusion molding, injection molding, calendering, inflation, compression molding and so on without particular limitations.

The shaped article of the resin composition obtained in the step (b) of the inventive method is then subjected to a low temperature plasma treatment in the step (c) by exposing the article to an atmosphere of low temperature plasma of an inorganic gas under a reduced pressure in the range from 0.001 to 10 Torr or, preferably, from 0.01 to 1 Torr. Namely, the shaped article is placed in a vacuumizable plasma chamber in which electrodes are installed and, while the pressure inside the chamber is kept under the above mentioned reduced pressure by the balance of the continuous introduction of an inorganic gas into and continuous evacuation of the chamber, an electric power of 10 watts to 100 kilowatts at a frequency of, for example, 10 kHz to 100 MHz is impressed between the electrodes to cause glow discharge so that low temperature plasma of the inorganic gas is generated inside the chamber to which the shaped article of the resin composition is exposed. It is not essential that the frequency of the electric power is within the above mentioned high frequency range but can be direct current or in the range of low frequencies and microwaves.

Although the electrodes are installed preferably inside the plasma chamber as is mentioned above, the electrodes may be installed outside the plasma chamber. A single high-frequency work coil surrounding the plasma chamber also may serve as an electrode for the generation of low temperature plasma. These electrodes are connected to a high frequency generator either by capacitive coupling or inductive coupling. At any rate, it is essential that care should be taken not to cause any adverse thermal denaturation on the surface of the shaped article under the treatment by the excessive heat of electric discharge.

The form of the electrodes, which should be installed preferably inside the plasma chamber, is not particularly limitative including plate-like, ring-like, rod-like, cylindrical and any other forms. The grounded electrode and the power electrode may be either of the same form or of different forms from each other. It is a convenient design of the plasma chamber that the chamber walls are made of a metal to serve as the grounded electrode surrounding the power electrode installed therein. The material of the electrodes may be copper, iron, aluminum and the like. It is preferable that the surface of, at least, the power electrode is provided with an insulating coating of a heat-resistant material such as glass, porcelain enamel, ceramic and the like having a breakdown voltage of at least 10,000 V to ensure stability of the electric discharge.

Suitable inorganic gases for forming the atmosphere of low temperture plasma are exemplified by helium, argon, nitrogen, nitrous oxide, nitrogen dioxide, oxygen, air, carbon monoxide, carbon dioxide, hydrogen, chlorine, hydrogen chloride, sulfur dioxide, hydrogen sulfide and the like. These inorganic gases can be used either singly or as a mixture of two kinds or more according to need. The pressure of the plasma-supporting inorganic gas inside the plasma chamber should be in the range from 0.001 to 10 Torr as is mentioned above or, preferably, from 0.01 to 1 Torr in order to ensure stability of the plasma generation.

When a shaped article of the resin composition has been subjected to the low temperature plasma treatment to an adequate extent, the surface layer of the article is converted to a barrier layer having flexibility and an adequately controlled degree of crosslinking so as to effectively prevent bleeding of the plasticizer and other additives compounded in the resin composition. The barrier layer thus formed is not detrimental against the heat-sealability of the shaped articles as in the high-frequency welding. The barrier layer has excellent durability so that the advantageous effects of the inventive method can be fully retained even after prolonged outdoor exposure of the shaped article. The advantages obtained by the inventive method are not only the above mentioned reduced or prevented bleeding of the plasticizer and other additives on the surface but the shaped articles prepared according to the inventive method are excellent in respect of other surface properties such as hydrophilicity, insusceptibility to stain, resistance against oils and chemicals and so on.

Following are the examples and comparative examples to illustrate the inventive method in more detail. In the following description, the expression of "parts" always refers to "parts by weight". In the Examples and Comparative Examples given below, each of the resin sheets either before or after the low temperature plasma treatment was subjected to the tests of the plasticizer, i.e. dioctyl phthalate, extraction and contamination with a contaminant blend. The testing procedures were as given below. The tests were undertaken with the resin sheets either before or after accelerated aging in a Weather-o-meter for 100 hours or 500 hours.

Plasticizer Exraction Test

A piece of the resin sheet was placed on the bottom of a cylindrical vessel having a capacity of 100 ml in such a manner that a surface area of 26 $cm^2$ of the resin sheet was exposed and contacted with 50 ml of n-hexane as a solvent introduced into the vessel. The vessel was shaken for 2 hours in a thermostat at 37° C. and the solvent was analyzed by gas chromatography to determine the concentration of dioctyl phthalate therein extracted out of the resin sheet.

Contamination Test

A contaminant blend was prepared by mixing together 380 g of Knuma earth, 170 g of carbon black, 170 g of portland cement, 170 g of finely divided silica flour, 85 g of bentonite, 85 g of kaolin, 5 g of iron oxide ($Fe_3O_4$) powder and 87 g of turbine oil and the blend was introduced into a polyethylene-made wide-mouth bottle of 5 liter capacity and thoroughly shaken. Thereafter, a 3 cm by 3 cm wide piece of the resin sheet was put into the bottle and thoroughly shaken together with the contaminant blend. The bottle was kept at 80° C. in a Geer's oven for 15 minutes and taken out of the oven to be shaken again followed by second heating for another 15 minutes. This procedure of shaking and heating was repeated 4 times so that the overall heating time at 80° C. was 60 minutes. After standing to be cooled to room temperature, the piece of resin sheet was taken out of the contaminant blend followed by brushing away the blend adhering to the piece. The degree of contamination of the resin sheet was visually examined and rated in A, B, C and D according to the following criteria.

A: absolutely free from contamination
B: slightly contaminated
C: contaminated but the initial color of the resin sheet recognizable
D: badly contaminated and the initial color of the resin sheet unrecognizable

EXAMPLE 1

Into a Henschel mixer of 5 liter capacity was taken 1 kg of a calcium carbonate filler (Whiton SB, a product by Shiraishi Calcium Co.) and, while the mixer is under running, 150 g of 3-glycidyloxypropyl trimethoxy silane were added gradually into the mixer and blended with the filler by operating the mixer for 15 minutes after completion of the addition of the silane compound to give a calcium carbonate filler surface-treated with an epoxy compound.

A resin composition was prepared by compounding 100 parts of a homopolymeric polyvinyl chloride resin (TK-1300, a product by Shin-Etsu Chemical Co.), 50 parts of dioctyl phthalate, 2.5 parts of a stabilizer based on barium and zinc compounds, 5 parts of an epoxidized soybean oil and 25 parts of the above prepared surface-treated filler and the resin composition was milled on a roller mill at 160° C. for 10 minutes followed by compression molding at a temperature of 170° C. into a sheet having a thickness of 0.5 mm. This sheet as prepared is referred to as the Sheet A hereinbelow.

The Sheet A was subjected to a low temperature plasma treatment for 10 seconds in a plasma chamber under a continuous flow of carbon monoxide gas to keep a pressure at 0.1 Torr while low temperature plasma was generated inside the chamber by the impression of a high frequency electric power of 20 kilowatts at a frequency of 110 kHz. The density of the electric power on the surface of the power electrode was 3.3 kilowatts/cm$^2$. The thus plasma-treated sheet is referred to as the Sheet B hereinbelow.

Each of the Sheets A and B was subjected to the plasticizer extraction test and contamination test either as such or after accelerated aging in a Weather-o-meter for 100 hours or 500 hours to give the results shown in Table 1.

COMPARATIVE EXAMPLE 1

The formulation of the resin composition and the procedure for the preparation of a resin sheet of the resin composition were the same as in Example 1 except that the calcium carbonate filler surface-treated with the epoxy compound in advance was replaced with 25 parts of the untreated calcium carbonate filler and 5 parts of 3-glycidyloxypropyl trimethoxy silane separately added to the mixer. The resin sheet thus prepared is referred to as the Sheet C hereinbelow. The Sheet C was subjected to the low temperature plasma treatment in the same manner under the same conditions as in Example 1. The thus plasma-treated sheet is referred to as the Sheet D hereinbelow. Each of the Sheets C and D was subjected to the tests in the same manner as in Example 1 to give the results shown in Table 1.

COMPARATIVE EXAMPLE 2

The formulation of the resin composition and the procedure for the preparation of a sheet of the resin composition were the same as in Example 1 except that the calcium carbonate filler surface-treated with the epoxy compound was replaced with the same amount of the untreated calcium carbonate filler. The resin sheet thus prepared is referred to as the Sheet E hereinbelow.

The Sheet E was subjected to a low temperature plasma treatment in the same manner and under the same conditions as in Example 1. The thus plasma-treated resin sheet is referred to as the Sheet F hereinbelow. Each of the Sheets E and F was subjected to the tests in the same manner as in Example 1 to give the results shown in Table 1.

TABLE 1

| Sheet | A | B | C | D | E | F |
|---|---|---|---|---|---|---|
| Plasticizer extraction, mg | | | | | | |
| As prepared | 121.5 | 0.8 | 118.2 | 0.5 | 126.8 | 0.6 |
| After 100 hours aging | 118.2 | 1.6 | 112.8 | 3.1 | 115.5 | 121.1 |
| After 500 hours aging | 105.5 | 4.2 | 109.3 | 8.3 | 103.4 | 116.3 |
| Contamination test | | | | | | |
| As prepared | D | A | D | A | D | A |
| After 100 hours aging | D | B | D | B | D | D |
| After 500 hours aging | D | B | D | C | D | D |

What is claimed is:

1. A method for the preparation of a shaped article of a vinyl chloride-based resin composition which comprises the steps of:
   (a) compounding (A) a vinyl chloride-based resin with (B) a filler having been treated on the surface with an epoxy compound, the amount of the epoxy compound being in the range from 0.05 to 30 parts by weight per 100 parts by weight of the vinyl chloride-based resin, to give a vinyl chloride-based resin composition;
   (b) shaping the vinyl chloride-based resin composition into an article; and
   (c) subjecting the shaped article to a treatment of exposure to an atmosphere of low temperature plasma of an inorganic gas under a pressure in the range from 0.001 to 10 Torr.

2. The method as claimed in claim 1 wherein the filler is calcium carbonate or titanium dioxide.

3. The method as claimed in claim 1 wherein the epoxy compound is selected from the group consisting of 3-glycidyloxypropyl trimethoxy silane and a hydrolysis-condensation product thereof, 3-glycidyloxypropyl triethoxy silane and a hydrolysis-condensation product thereof, phenyl glycidyl ether, ethyleneglycol diglycidyl ether, vinyl cyclohexene diepoxide, N,N-diglycidylamine, divinylbenzene diepoxide, resorcinol diglycidyl ether, polyepichlorohydrin, triglycidyl cyanurate, 1,3-bis(N,N-diglycidylaminomethyl) cyclohexane and N,N,N'N'-tetraglycidyl 1,3-xylenediamine.

4. The method as claimed in claim 3 wherein the epoxy compound is selected from the group consisting of 3-glycidyloxypropyl trimethoxy silane, 3-glycidyloxypropyl triethoxy silane and hydrolysis-condensation products thereof.

* * * * *